May 18, 1948.  G. E. REITTER  2,441,596
MECHANISM FOR ADJUSTING THE AMOUNT OF TRAVEL OF RIDERS ON LEAD SCREWS
Filed Sept. 1, 1945  2 Sheets-Sheet 1

INVENTOR
G. E. REITTER
BY J. MacDonald
ATTORNEY

May 18, 1948. G. E. REITTER 2,441,596
MECHANISM FOR ADJUSTING THE AMOUNT OF TRAVEL OF RIDERS ON LEAD SCREWS
Filed Sept. 1, 1945 2 Sheets-Sheet 2
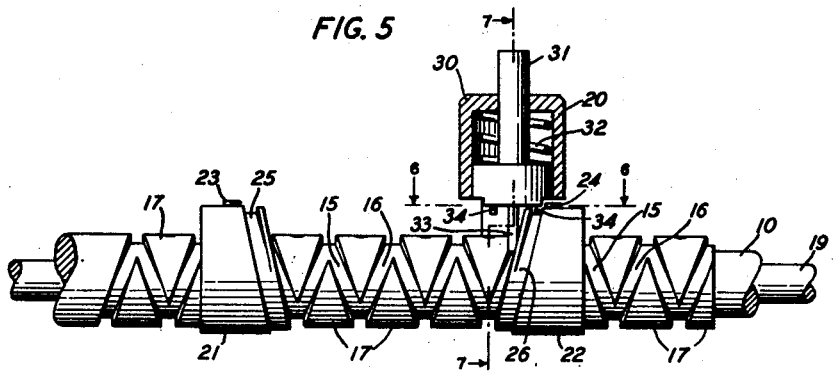
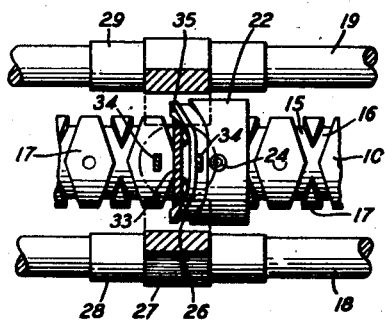
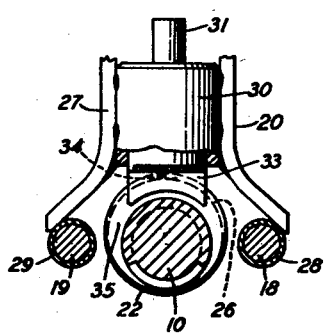
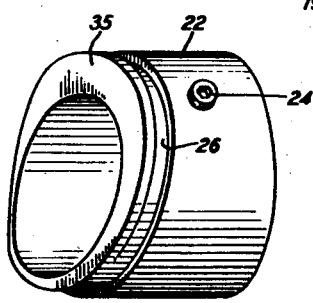
INVENTOR
G. E. REITTER
BY
ATTORNEY

UNITED STATES PATENT OFFICE 2,441,596

MECHANISM FOR ADJUSTING THE AMOUNT OF TRAVEL OF RIDERS ON LEAD SCREWS

George E. Reitter, Chatham, N. J., assignor to Bell Telephone Laboratories, Incorporated, New York, N. Y., a corporation of New York Application September 1, 1945, Serial No. 613,981

4 Claims. (Cl. 74—57)

This invention relates to a mechanism for limiting the mount of travel of a rider or carriage on a lead screw and more particularly to a device for translating rotary motion into reciprocating motion of varying length stroke.

Heretofore when it was desired to reverse the direction of a rider or carriage positioned on a screw-threaded shaft having right and left-hand threads thereon, in order to translate rotary motion into reciprocating motion it was necessary to have the rider or member traveling in the thread of the screw to traverse the entire course of the thread in one direction before reversing. Consequently, the rider was required to complete the stroke in both directions and travel the entire length of the screw during the period that the machine was in operation. Hence, for varying the length of the stroke it was necessary to provide lead screws of varying lengths. Thus when the length of a stroke in a particular machine was to be changed or varied the machine would have to be disassembled in order to insert a lead screw of the proper length.

The object of the present invention is to provide controlled reciprocating motion so that the length of travel of the rider or carriage in each direction may be set in advance and run in accordance with the setting without interruption or stopping of the motion.

A further object of the invention is to provide a device which will translate rotary motion into reciprocating motion in such a manner that the time lag at the end of each stroke is reduced to a minimum or practically eliminated.

The present invention contemplates the use of a cylindrical-shaped cam secured at various positions along a lead screw, having right and left intersecting spiral grooves thereon, to limit the amount of travel or reciprocating motion of a rider or carriage positioned on said lead screw and riding in the grooves thereof, by causing the rider when it reaches the cam to reverse its direction of travel. By employing two such cams on a threaded shaft the amount of travel of the rider can be adjusted within very close limits.

Various detailed features of construction contributing to the effectiveness of my invention will be pointed out in the following specification when read in connection with the drawings, of which:

Fig. 5 is a view similar to Fig. 2 except that the shaft has been rotated 180 degrees and the plunger of the rider is in engagement with the surface of the cylindrical cam;

Fig. 6 is a fragmentary plan view, partly in section, taken on line 6—6 of Fig. 5;

Fig. 7 is a fragmentary view in cross-section taken on line 7—7 of Fig. 5 and shows the arcuate portion of the plunger member of the rider out of engagement with the threaded shaft and riding on the cam; and Fig. 8 is an enlarged view of the cam-shaped member.

Figure 1:
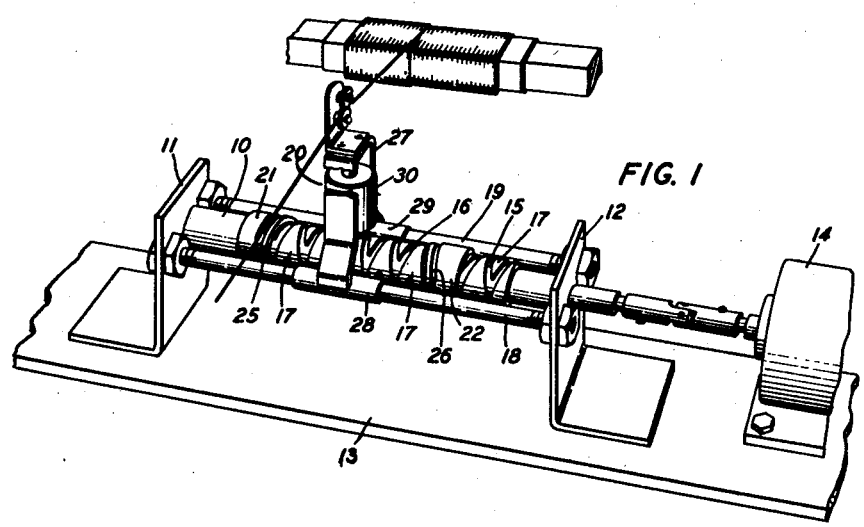
Fig. 1 is a fragmentary perspective view illustrating the present invention used in the winding of precision coils for electrical apparatus.

Referring now to the drawings, the shaft 10 is journaled and supported in suitable brackets 11 and 12 which may be secured to a suitable supporting surface 13, suitable bearings (not shown) are provided to insure the smooth even running of the shaft 10, which may be rotated by any suitable means, for example, by a motor 14 directly connected to the shaft as shown in Fig. 1.

The shaft 10 is provided with two grooves 15 and 16 which traverse the shaft 10 in opposite directions and form intersecting spirals. These grooves 15 and 16 form continuous intersecting spiral paths leading back and forth, or up and down the shaft 10, and the side walls of the grooves are at substantially right angles with respect to the bottoms thereof. The crossing and recrossing of the grooves 15 and 16 form identical-shaped rhombus or diamond-shaped lands 17 along the shaft 10.

As shown in Fig. 1, there is positioned in the brackets 11 and 12, side rods 18 and 19 for slidingly supporting the rider or carrier 20 over the shaft 10.

As shown in the various figures, and in detail in Fig. 8, there is slidably mounted on the shaft 10, a pair of cylindrical cam members 21 and 22. These cams may be rigidly secured to the shaft 10 by means of the set screws 23 and 24. The opposite ends of the cams 21 and 22 are provided with endless square cut circumferential grooves 25 and 26 of the same dimensions and lead as the grooves 15 and 16 in the shaft 10, and are beveled on one end thereof so that their opposing surfaces are of substantially the same configuration as the grooves 15 and 16 in the shaft 10.

Figure 4:
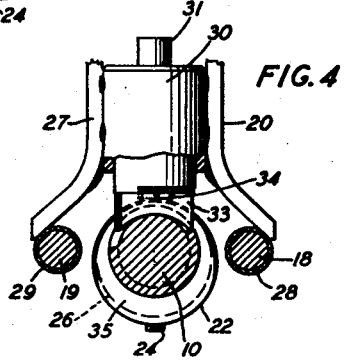
Fig. 4 is a fragmentary view, in cross-section, taken on line 4—4 of Fig. 2 and shows the arcuate bottom portion of the plunger member of the rider in contact with the groove on the shaft.

Mounted on the shaft 10 and slidably supported on each side thereof by means of the guide rods 18 and 19 is a rider or carrier 20. As shown in Fig. 1 and more in detail in Figs. 4 and 7, this rider comprises a substantially inverted U-shaped member 27 having secured to each leg thereof a sleeve 28 and 29 which is in sliding engagement with the rods 18 and 19 as shown. Centrally disposed between the legs of the U-shaped member 27 and secured thereto is a cylindrical member 30. Slidably and rotatably positioned within the member 30 is a plunger member 31 the upper portion of which is reduced in diameter and is guided in its movement by projecting some distance through the upper portion of the member 30. The lower portion of the plunger 31 is slightly smaller in diameter than the inside of the cylinder 30 to provide free movement both rotatably and slidably. Located between the enlarged portion of the plunger 31 and the inside top portion of the cylinder 30 is a coil spring 32 which exerts pressure on the plunger 31 and maintains it in an extended position.

Figure 2:
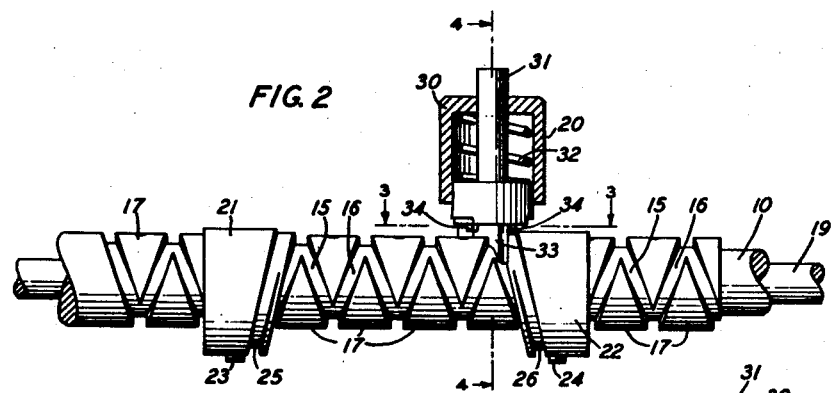
Fig. 2 is a fragmentary elevational view, partly in section, showing the cylindrical cams mounted on a threaded shaft with the rider in position thereon and the plunger of said rider in engagement with the bottom of the groove.
Figure 3:
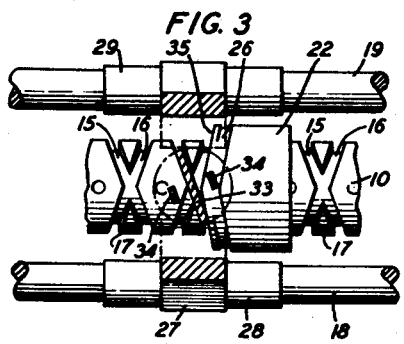
Fig. 3 is a fragmentary plan view partly in section, taken on line 3—3 of Fig. 2.

As shown in the various figures and more in detail in Figs. 2 and 7, the lower surface of the plunger 31 has downwardly extending therefrom a centrally disposed arcuate-shaped knife-like member 33 the lower edge of which is so shaped that it fits the contour of the shaft 10 in the bottom of the grooves 15 and 16 and is guided in its travel thereby.

Located adjacent said arcuate member 33, on the bottom of the plunger 31, are the protuberances 34—34 which are adapted to selectively engage the groove 25 or 26 of cam 21 or 22 when the rotation of the shaft 10 causes contact to be made therewith, which in turn causes the plunger 31 to ride upwardly against the tension of the spring 32 thereby lifting it free of the groove 15 or 16 in the shaft 10. Continued rotation of the shaft 10 causes the arcuate member 33 to bear against the beveled portion 35—35 of the cam 21 or 22, depending upon the direction of travel of the rider 20, and be rotated sufficiently so that it will drop into position in the other groove when the lower portion of the cam permits the protuberance 34 to become disengaged from its respective groove 25 or 26 in the cam 21 or 22.

In the operation of the device of this invention which translates a rotary motion into a reciprocating motion of varying and adjustable length, the shaft is continuously driven in either a clockwise or counter-clockwise direction. This does not affect the operation of the device. However, it may be driven continuously and needs no stopping and starting of the shaft 10 to provide its reciprocating motion which has many practical applications, for example, winding precision coils for electrical apparatus as shown in Fig. 1, due to the fact that with the structure of this invention little or no time lag at the end of the travel of the rider or carriage 20 is experienced.

As heretofore pointed out the shaft 10 is continuously driven which due to the grooves 15 and 16 cut therein and the knife-like member 33 of the plunger 31, which forms part of the rider 20, riding therein, causes the rider and any apparatus secured thereto or controlled thereby to traverse the shaft 10 in either direction depending upon the particular groove with which the member 33 is in engagement. As the rider or carriage 20 traverses the shaft 10 it will come into engagement with either cam 21 or 22 which causes the protuberance 34 to engage the groove in the cam, ride up on the high portion thereof and lift the member 33 out of its respective groove and due to the beveled portion on the end of the cam cause the member 33 to be rotated slightly until it is in alignment with the other groove. Continued rotation of the shaft 10 permits the protuberance 34 to ride out of the groove in the cam and allows the arcuate member 33 to engage the other groove which causes the rider 20 to proceed in the opposite direction. This same cycle of operation is repeated each time the member 33 of the rider 20 comes into engagement with either of the cams 21 or 22.

It will be observed that the amount of travel of the rider or carriage 20 on the shaft 10 may be readily adjusted between very close limits by adjusting the cams 21 and 22 and, if desired, a plurality of riders or carriages with their associated cams may be mounted on a single shaft.

While I have shown and described the preferred embodiment of my invention, it is to be understood that various changes and modifications may be made therein without departing from the spirit of the invention and I am only limited by the scope of the appended claims.

What is claimed is:

1. A mechanism for converting rotary motion into reciprocating motion comprising a shaft, means for rotating said shaft, means for supporting said shaft, intersecting spiral grooves traversing said shaft to form rhombus-shaped lands thereon, a member traveling in one of said grooves and maintained in engagement therewith, and means on said shaft comprising a cam-shaped sleeve for raising said member out of its present groove and guiding it into the other when said member comes into engagement with said cam to cause said member to reverse its direction of travel.

2. A mechanism for converting rotary motion into reciprocating motion comprising a shaft, means for rotating said shaft, means for supporting said shaft, intersecting spiral grooves traversing said shaft to form rhombus-shaped lands thereon, a carriage slidably mounted in spaced relation with respect to said shaft, a rotatable and slidably mounted member carried by said carriage and traveling in one of said grooves and maintained in engagement therewith and means on said shaft to raise said member out of its present groove and guide it into the other groove to cause said carriage to travel in the opposite direction.

3. A mechanism for converting rotary motion into reciprocating motion comprising a shaft, means for rotating said shaft, means for supporting said shaft, intersecting spiral grooves traversing said shaft to form rhombus-shaped lands thereon, a member traveling in one of said grooves and maintained in engagement therewith, a plurality of adjustable means on said shaft to raise said member out of its present groove and guide it into the other groove to cause said member to travel in the opposite direction.

4. A mechanism for converting rotary motion into reciprocating motion comprising a shaft, means for rotating said shaft, means for supporting said shaft, intersecting spiral grooves traversing said shaft to form rhombus-shaped lands thereon, a carriage slidably mounted in spaced relation with respect to said shaft, a rotatable and slidably mounted member carried by said carriage and traveling in one of said grooves and mounted in engagement therewith and a plurality of means on said shaft to raise said member out of its present groove and guide it into the other to cause said carriage to travel in the opposite direction.

GEORGE E. REITTER.

REFERENCES CITED

The following references are of record in the file of this patent:

UNITED STATES PATENTS

| Number | Name | Date |
|---|---|---|
| 271,909 | Pormenter | Feb. 6, 1883 |

FOREIGN PATENTS

| Number | Country | Date |
|---|---|---|
| 4,097 | Great Britain | Feb. 12, 1898 |